(12) United States Patent
Street et al.

(10) Patent No.: US 11,585,002 B2
(45) Date of Patent: Feb. 21, 2023

(54) FLOW CELL DECONTAMINATION

(71) Applicant: ViZn Energy Systems, Inc., Columbia Falls, MT (US)

(72) Inventors: Aaron Mannington Street, Kalispell, MT (US); Derek C. Tarrant, Kalispell, MT (US)

(73) Assignee: ViZn Energy Systems, Inc., Columbia Falls, MT (US)

( * ) Notice: Subject to any disclaimer, the term of this patent is extended or adjusted under 35 U.S.C. 154(b) by 0 days.

(21) Appl. No.: 17/223,931

(22) Filed: Apr. 6, 2021

(65) Prior Publication Data
US 2022/0316082 A1 Oct. 6, 2022

(51) Int. Cl.
*C25B 15/08* (2006.01)
*H01M 8/06* (2016.01)
*C25B 15/025* (2021.01)

(52) U.S. Cl.
CPC .......... *C25B 15/085* (2021.01); *C25B 15/087* (2021.01); *H01M 8/0693* (2013.01); *C25B 15/025* (2021.01)

(58) Field of Classification Search
CPC .................................................. C25B 15/083
See application file for complete search history.

(56) References Cited

U.S. PATENT DOCUMENTS

| 9,509,011 B2 | 11/2016 | Evans et al. |
| 10,181,615 B2 | 1/2019 | Song et al. |
| 2018/0316037 A1* | 11/2018 | Song ................. G06V 40/1394 |
| 2019/0097253 A1 | 3/2019 | Song et al. |

FOREIGN PATENT DOCUMENTS

| CN | 102593481 A | 7/2012 |
| KR | 10-1955893 B1 | 3/2019 |
| KR | 10-2219191 B1 | 2/2021 |
| WO | 2020-021611 A1 | 1/2020 |

OTHER PUBLICATIONS

International Search Report and Written Opinion of the International Searching Authority for International Application No. PCT/US2022/023606, dated Jul. 25, 2022, 8 pgs.

* cited by examiner

*Primary Examiner* — Ciel P Contreras
(74) *Attorney, Agent, or Firm* — Brooks Kushman P.C.

(57) ABSTRACT

A controller stops flow of posolyte through a positive electrode chamber of a flow cell to trap the posolyte within the positive electrode chamber and hydraulically isolate the flow cell without stopping flow of negolyte through a negative electrode chamber of the flow cell, discharges the flow cell until hydrogen gas is evolved at a reactive surface of the positive electrode chamber while the posolyte is trapped within the positive electrode chamber, and subsequently discontinues the discharge and restarts the flow of the posolyte through the positive electrode chamber.

14 Claims, 2 Drawing Sheets

FLOW CELL DECONTAMINATION

TECHNICAL FIELD

This disclosure relates to the control of flow cells.

BACKGROUND

An electrochemical cell may include anode and cathode sides separated by a separator arrangement. The anode side may include an anode current collector, an anode electroactive material (oxidized on discharge), and an electrolyte. The cathode side may include a cathode current collector, a cathode electroactive material (reduced on discharge), and an electrolyte. The separator arrangement separating the anode and cathode sides permits ionic flow therebetween. The current collectors, electroactive materials, electrolytes, and separator arrangement thus form an electrochemical reactor that converts chemical energy to electricity. The current collectors may be (externally) electrically connected together to form an electrical circuit.

SUMMARY

A method for decontaminating a flow cell includes trapping posolyte within a positive electrode chamber of the flow cell to hydraulically isolate the flow cell without stopping flow of negolyte through a negative electrode chamber of the flow cell, and discharging the flow cell while the posolyte is trapped within the positive electrode chamber such that, sequentially, charged species of the posolyte within the positive electrode chamber are consumed, electrochemically obstructive transition metal contaminants on a reactive surface of the positive electrode chamber are electrochemically reduced and become electrochemically nonobstructive, and hydrogen gas is evolved at the reactive surface for a predetermined time period. The method also includes, after expiration of the predetermined time period, discontinuing the discharging and restarting flow of the posolyte through the positive electrode chamber.

A control system for a flow cell includes a controller that stops flow of posolyte through a positive electrode chamber of the flow cell to trap the posolyte within the positive electrode chamber and hydraulically isolate the flow cell without stopping flow of negolyte through a negative electrode chamber of the flow cell. The controller also discharges the flow cell until hydrogen gas is evolved at a reactive surface of the positive electrode chamber while the posolyte is trapped within the positive electrode chamber, and subsequently discontinues the discharge and restarts the flow of the posolyte through the positive electrode chamber.

A control system for a flow cell includes a controller that stops flow of posolyte through a positive electrode chamber of the flow cell without stopping flow of negolyte through a negative electrode chamber of the flow cell. The controller also discharges the flow cell while the flow of posolyte through the positive electrode chamber is stopped, and after a voltage of the flow cell has remained at or below a threshold value for at least a predetermined period of time, discontinues the discharge and restarts the flow of the posolyte through the positive electrode chamber.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A flow cell is a type of rechargeable cell in which electrolyte containing one or more dissolved electroactive species flows through (into and out of) an electrochemical reactor that converts chemical energy to electricity. Additional electrolyte containing one or more dissolved electroactive species is stored externally, generally in tanks, and is usually pumped through the electrochemical reactor (or electrochemical reactors). A flow cell may thus have variable capacity depending on the size of the external storage tanks.

Figure 1:
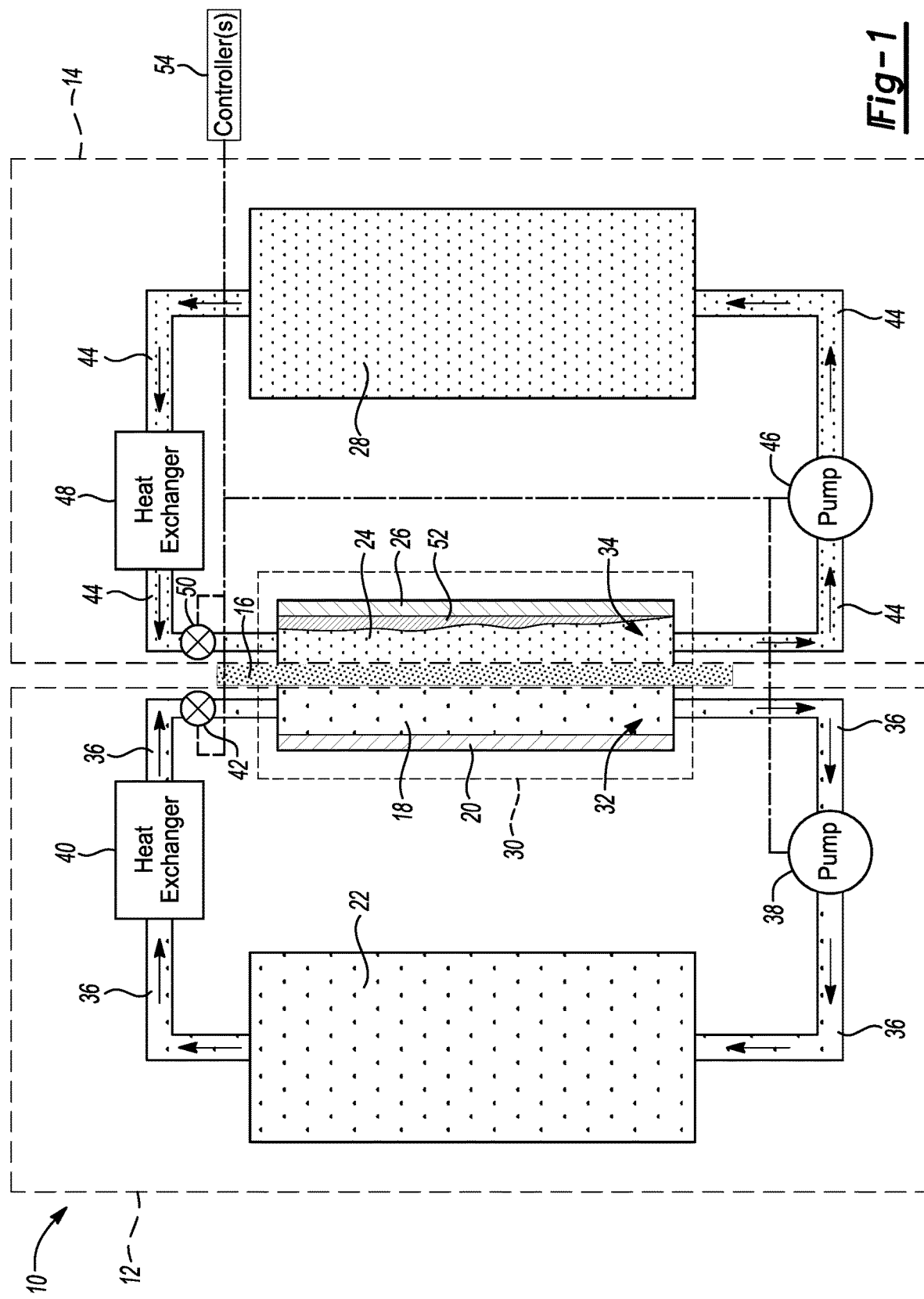
FIG. 1 is a schematic diagram of a flow cell system.

Referring to FIG. 1, a flow cell 10 may include a positive side 12 and a negative side 14 separated by a separator 16 (e.g., an ion exchange membrane). The positive side 12 includes a positive chamber 18, positive current collector 20, and posolyte reservoir 22. Likewise, the negative side 14 includes a negative chamber 24, negative current collector 26, and negolyte reservoir 28. The separator 16 permits ionic flow between electroactive materials in the positive and negative chambers 18, 24. The chambers 18, 24, current collectors 20, 26, and separator 16 thus form an electrochemical reactor 30 that converts chemical energy to electricity (and, in certain arrangements, electricity to chemical energy). As such, the positive current collector 20 and negative current collector 26 may be (externally) electrically connected (together or with other current collectors) to form an electrical circuit.

Posolyte 32 and negolyte 34 typically combine an electrolyte used to transport ions with positive and negative reactive materials, respectively, through soluble intermediates. The posolyte 32 and negolyte 34 are circulated on respective sides of the flow cell 10 to drive the reaction within the electrochemical reactor 30. Hence, the posolyte 32 and negolyte 34 are mobile. To that end, the positive side 12 further includes inlet/outlet pipes 36 in fluid communication with the positive chamber 18 and posolyte reservoir 22, and circulation pump 38, heat exchanger 40, and valve 42 each operatively arranged with the inlet/outlet pipes 36. The circulation pump 38, as the name suggests, circulates the posolyte 32 through the positive chamber 18, posolyte reservoir 22, and inlet/outlet pipes 36. The heat exchanger 40 may be operated to control the temperature of the posolyte 32. The valve 42 may be operated to control the flow of posolyte 32 into and/or out of the positive chamber 18.

The negative side 14 includes inlet/outlet pipes 44, circulation pump 46, heat exchanger 48, and valve 50. The inlet/outlet pipes 44 are in fluid communication with the negative chamber 24 and negolyte reservoir 28, and circulation pump 46, heat exchanger 46, and valve 50 are each operatively arranged with the inlet/outlet pipes 44. The circulation pump 46 circulates the negolyte 34 through the anode chamber 24, anolyte reservoir 28, and inlet/outlet pipes 44. The heat exchanger 46 may be operated to control the temperature of the negolyte 34. The valve 50 may be operated to control the flow of negolyte 34 into and/or out of the negative chamber 24.

The negative side 14 may include a slurry of zinc oxide and sodium hydroxide mixed in the negolyte reservoir 28 to ensure maximum dissolution of active material (zincate) in the solution. This solution may be used as the negolyte 34 for the flow cell 10. On charge, the soluble zincate is reacted at the surface of the negative current collector 26 to deposit zinc metal 52 on the surface of the negative current collector 26 adjacent to the negative chamber 24. On discharge, a load reverses the reaction oxidizing the zinc metal 52 off the surface of the negative current collector 26. This discharge product is normally stored in the negolyte reservoir 28 but should be managed to ensure it does not deposit elsewhere in the system.

One or more controllers 54 may operate the circulation pumps 38, 46 and valves 42, 50 to flow the posolyte 32 and negolyte 34 into and out of the chambers 18, 24 and reservoirs 22, 28 respectively. Such flow often requires flow and temperature controls. The flow cell 10 may thus include current, voltage, temperature and/or other sensors arranged in known fashion with the electrochemical reactor 30, reservoirs 22, 28, etc. and that are in communication with the one or more controllers 54 to facilitate the controls. With multiple cells (as in a battery), a typical flow system may become more complicated because the same reservoir may be used for the multiple cells.

Normal operation of the flow cell 10 may result in presence of charged species within the posolyte 32, as well as formation of electrochemically obstructive transition metal breakdown products/contaminants (e.g., iron oxide contaminants) on the reactive surface of the positive current collector 20 (a surface partially defining the positive chamber 18). These contaminants restrict the available reactive electrode surface area and hamper operation of the flow cell 10. Effective methods for removing such contaminants are therefore necessary to maintain the efficiency of the system.

Figure 2:
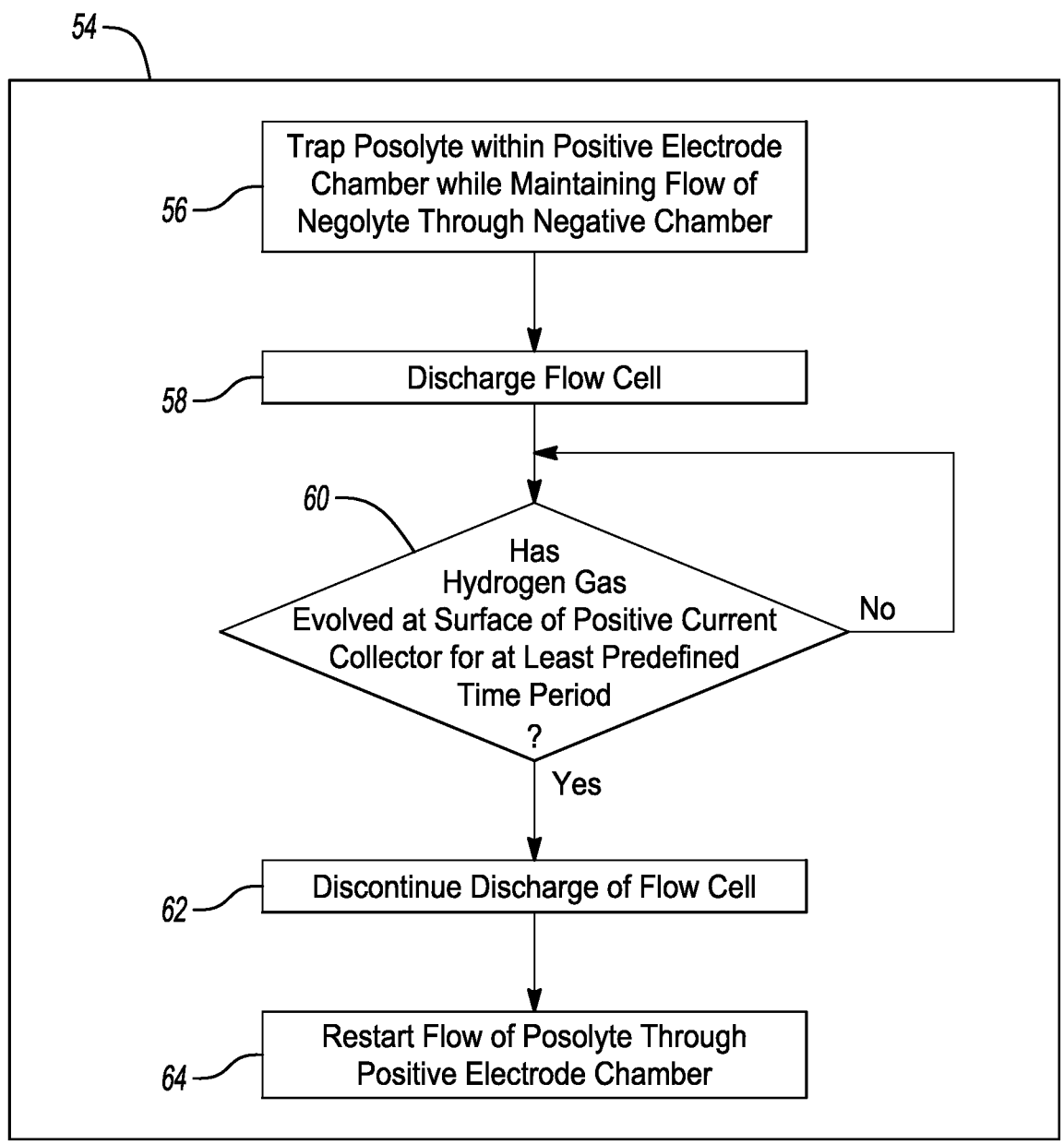
FIG. 2 is a flow chart of a control algorithm for decontaminating the flow cell of FIG. 1.

Referring to FIGS. 1 and 2, at operation 56, posolyte is trapped within a positive electrode chamber of a flow cell while maintaining flow of negolyte through a negative chamber of the flow cell. The one or more controllers 54 may turn off the pump 38 and close the valve 42 to trap the posolyte 32 within the positive chamber 18 while maintaining operation of the pump 46 with the valve 50 open such that the negolyte 34 continues to flow through the negative chamber 24. At operation 58, the flow cell is discharged while the posolyte is trapped within the positive chamber. The one or more controllers 54 may connect a load across the current collectors 20, 26 to discharge the flow cell 10. At operation 60, it is determined whether hydrogen gas has evolved from a surface of a positive current collector for at least a predetermined period of time (e.g., 20 seconds, etc.). The one or more controllers 54 may require each cell voltage to be at or below a predetermined voltage threshold (e.g., 300 millivolts) at which hydrogen generation is known to occur at the positive current collector 20 for at least the predetermined period of time. The predetermined voltage threshold may be determined via simulation or testing, and be different for different flow cell arrangements. If no, operation 60 is repeated. If yes, at operation 62, discharge of the flow cell is discontinued. The one or more controllers 54 may disconnect the load from the current collectors 20, 26. At operation 64, flow of posolyte through the positive chamber is then restarted. The one or more controllers 54 may open the valve 42 and turn on the pump 38. These operations may be performed periodically or as needed. Additionally, these operations may be precluded if a state of charge of the flow cell is less than a certain value, which can be determined via simulation or testing: Such trapping and discharging may cause other issues if the state of charge is too low.

Several processes occur during discharge of the flow cell 10 while the posolyte 32 is trapped within the positive chamber 18. First, dissolved electroactive charged species of the posolyte 32 (e.g., ferric iron) within the positive chamber 18 are consumed along with a commensurate quantity of reactants in the negolyte 34. This is the normal cell reaction. Once the dissolved electroactive charged species in the posolyte 32 have been consumed, there is still sufficient voltage potential between the posolyte and negolyte systems to allow other reactions to occur at the reactive surface of the positive current collector 20. The next such (available) reaction is the reduction of any electrochemically obstructive transition metal contaminants (oxides/hydroxides) on the reactive surface of the positive current collector 20 to yield electrochemically non-obstructive or conductive deposits. Once such obstructive deposits have been reduced, the third and final reaction involves the electrolysis of electrolyte water with hydrogen gas being evolved at the reactive surface of the positive current collector 20.

Each of these reactions can be identified by their unique overall cell voltage potential. During this process the reaction that occurs at the highest voltage always occurs first and the voltage is maintained at the voltage required for that reaction until all reactants are consumed. The reduction of any electrochemically obstructive transition metal contaminants cannot occur until the dissolved electroactive charged species of the posolyte 32 within the positive chamber 18 are consumed. Similarly, hydrogen gas evolution cannot begin until the electrochemically obstructive transition metal contaminants are consumed. Thus, hydrogen gas evolution and its associated cell voltage signature is evidence that the charged species have been consumed and that the contaminants have become non-obstructive.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The flow cell 10, for example, may be a cobalt-cyanide flow cell, a ferro-cyanide flow cell, or a manganese-cyanide flow cell. Other arrangements are also possible.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method for decontaminating a flow cell, comprising:
   trapping posolyte, from a posolyte reservoir, within a positive electrode chamber of the flow cell to stop posolyte flow through the flow cell without stopping flow of negolyte, from a negolyte reservoir that is isolated from the posolyte reservoir, through a negative electrode chamber of the flow cell;
   discharging the flow cell while the posolyte is stagnant within the positive electrode chamber such that, sequentially, charged species of the posolyte within the positive electrode chamber are consumed, electrochemically obstructive transition metal contaminants on a reactive surface of the positive electrode chamber are electrochemically reduced and become electrochemically non-obstructive, and hydrogen gas is evolved at the reactive surface for a predetermined time period;
   after expiration of the predetermined time period, discontinuing the discharging; and
   restarting flow of the posolyte through the positive electrode chamber.

2. The method of claim 1 further comprising precluding the trapping while a state of charge of the flow cell is less than a predefined threshold.

3. The method of claim 1, wherein the electrochemically obstructive transition metal contaminants include iron contaminants.

4. The method of claim 1, wherein the trapping, discharging, and restarting are performed periodically.

5. A control system for a flow cell comprising:
   a controller programmed to stop flow of posolyte from a posolyte reservoir through a positive electrode chamber of the flow cell to trap the posolyte within the positive electrode chamber without stopping flow of negolyte from a negolyte reservoir that is isolated from the posolyte reservoir through a negative electrode chamber of the flow cell, to discharge the flow cell until hydrogen gas is evolved at a reactive surface of the positive electrode chamber while the posolyte is trapped within the positive electrode chamber, and to subsequently discontinue the discharge and restart the flow of the posolyte through the positive electrode chamber.

6. The control system of claim 5, wherein the controller is further programmed to preclude the stop while a state of charge of the flow cell is less than a predefined threshold.

7. The control system of claim 5, wherein during the discharge charged species of the posolyte within the positive electrode chamber are consumed, and electrochemically obstructive transition metal contaminants on the reactive surface are electrochemically reduced and become electrochemically non-obstructive.

8. The control system of claim 7, wherein the electrochemically obstructive transition metal contaminants include iron contaminants.

9. The control system of claim 5, wherein the flow cell is a metal-cyanide flow cell.

10. The control system of claim 9, wherein the flow cell is a cobalt-cyanide flow cell, a ferro-cyanide flow cell, or a manganese-cyanide flow cell.

11. A control system for a flow cell comprising:
    a controller programmed to stop flow of posolyte from a posolyte reservoir through a positive electrode chamber of the flow cell without stopping flow of negolyte from a negolyte reservoir that is isolated from the posolyte reservoir through a negative electrode chamber of the flow cell, to discharge the flow cell while the flow of posolyte through the positive electrode chamber is stopped, and after a voltage of the flow cell has remained at or below a threshold value for at least a predetermined period of time, to discontinue the discharge and restart the flow of the posolyte through the positive electrode chamber.

12. The control system of claim 11, wherein the controller is further programmed to preclude the stop while a state of charge of the flow cell is less than a predefined threshold.

13. The control system of claim 11, wherein the flow cell is a metal-cyanide flow cell.

14. The control system of claim 13, wherein the flow cell is a cobalt-cyanide flow cell, a ferro-cyanide flow cell, or a manganese-cyanide flow cell.

* * * * *